March 27, 1945.  A. KELLER  2,372,583
COLLAPSIBLE TOP FOR MOTOR VEHICLES
Filed June 17, 1940  3 Sheets-Sheet 2
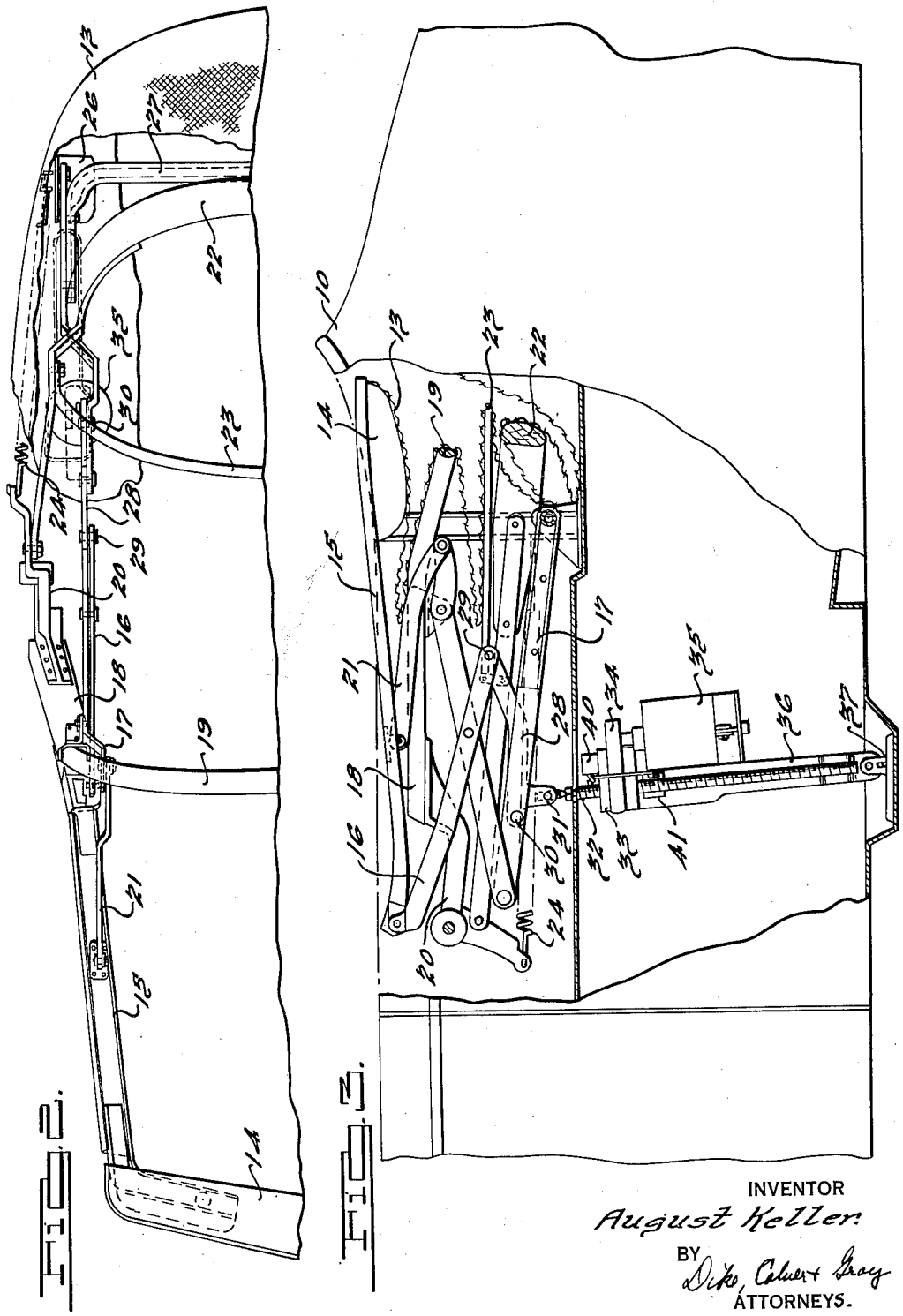
INVENTOR
August Keller.
BY Dike, Calvert Gray
ATTORNEYS.

March 27, 1945. A. KELLER 2,372,583
COLLAPSIBLE TOP FOR MOTOR VEHICLES
Filed June 17, 1940 3 Sheets-Sheet 3
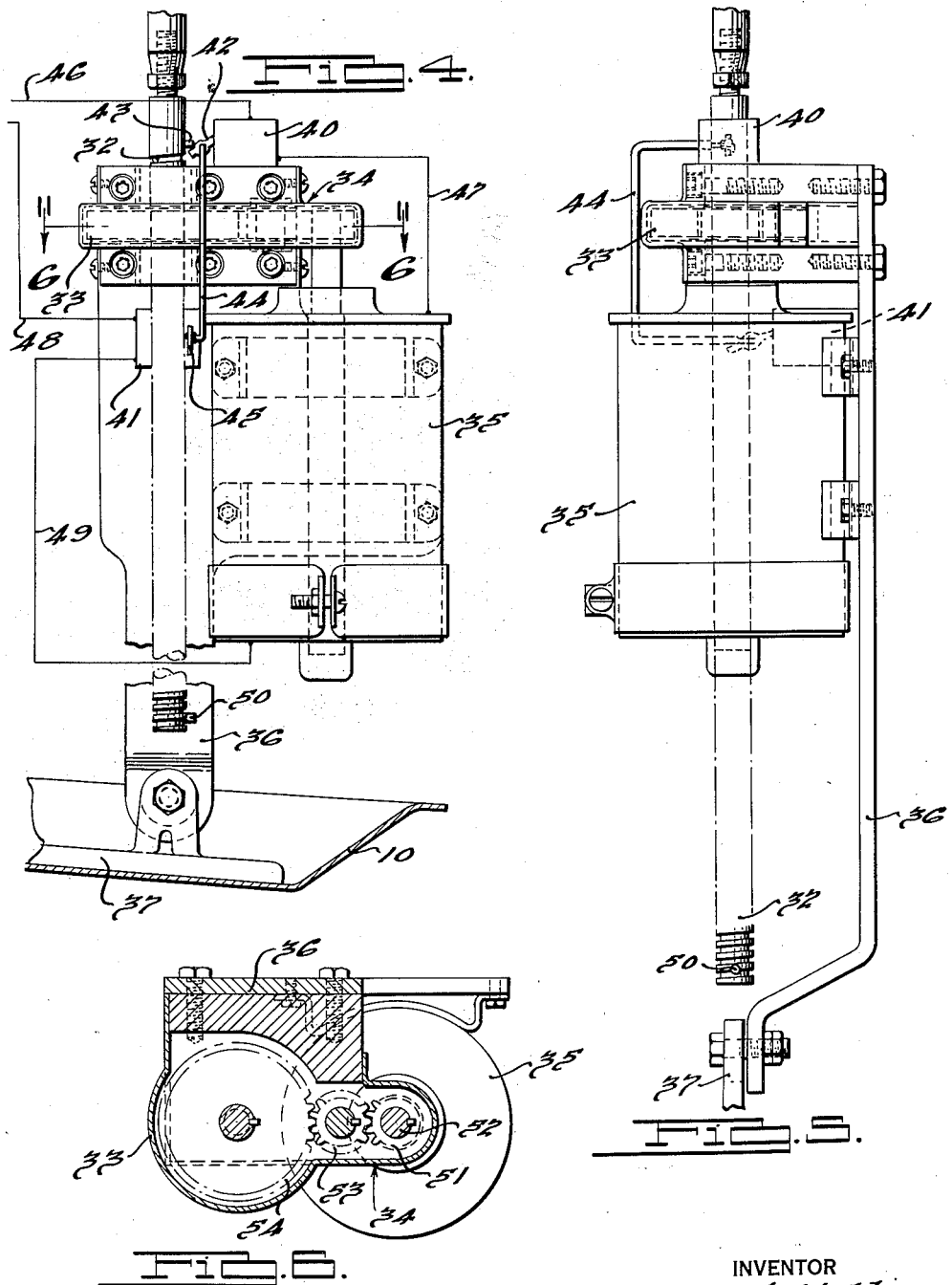
INVENTOR
August Keller
BY Dike, Calver & Gray
ATTORNEYS.

Patented Mar. 27, 1945

2,372,583

UNITED STATES PATENT OFFICE 2,372,583

COLLAPSIBLE TOP FOR MOTOR VEHICLES

August Keller, Dearborn, Mich., assignor to Motor State Products Company, Ypsilanti, Mich., a corporation of Michigan Application June 17, 1940, Serial No. 340,903

3 Claims. (Cl. 296—117)

The present invention relates to a collapsible top for motor vehicle bodies and particularly to power driven actuating devices for raising and lowering such tops.

The objects of the present invention are:

First, to provide a collapsible top and a power operated actuating device for raising and lowering the same, the top and actuating device being simplified in construction and operation and readily adapted for production on a commercial scale.

Second, to provide a novel power operated top actuating mechanism particularly adapted for use in raising and lowering a collapsible top on a motor vehicle body and which is particularly adapted to raise and lower the top by actuation of the prime mover and providing for control of the prime mover from a control member placed adjacent the passenger compartment of the motor vehicle, the power actuating mechanism being compact in its design and adapted for ready mounting in the trunk or rear compartment of the motor vehicle body.

Third, to provide a collapsible top for a motor vehicle which is adapted for use with power driven top actuating devices for raising and lowering the top, the top construction being such that the power actuated device is used to apply forces to but one side of the top structure to effect the raising and lowering thereof, the top construction being so arranged that the application of forces to but one side thereof does not effect any binding of the top members or prevent a satisfactory and smooth raising and lowering of the top.

Fourth, to provide a collapsible top construction for a motor vehicle body which is of a rugged and substantial construction and which possesses safety features designed to minimize possible injury to occupants of the motor vehicle in the event of an accident to said vehicle.

Fifth, to provide a top construction of the collapsible type which is so constructed and balanced that the top may be readily raised and lowered by the application of forces to structural members forming a part of the framework of said top.

Other objects and advantages of this invention will appear in the following description and appended claims, reference being had to the accompanying drawings forming a part of this specification wherein like reference characters designate corresponding parts in the several views, and in which:

Fig. 2 is a fragmentary plan view with parts broken away showing one side of the top structure shown in elevation in Fig. 1.

Fig. 3 is a fragmentary side elevation of a motor vehicle body with parts broken away and partially in section showing the top in its folded position.

Figs. 4 and 5 are, respectively, a side elevation and a front elevation showing the power actuated device embodying the present invention as it is arranged for raising and lowering the collapsible top of the present invention.

Fig. 6 is a section taken substantially on the line 6—6 of Fig. 4 looking in the direction of the arrows.

Figure 1:
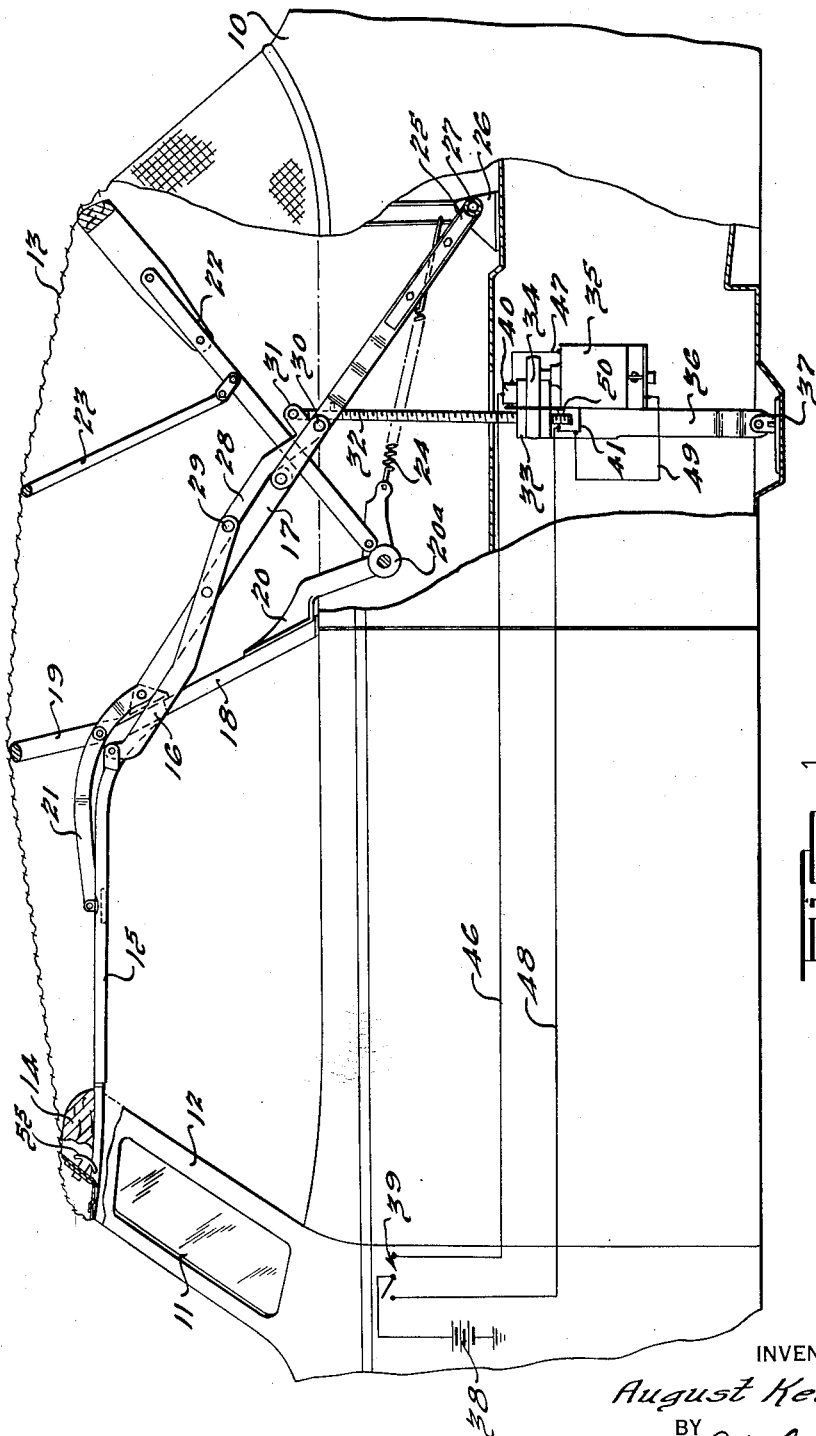
Fig. 1 is a side elevation partially in section and with parts broken away showing a collapsible top and power actuated operating mechanism of the present invention. In this view the top is shown in its raised position and a fragmentary side elevation of the vehicle body with parts broken away is also shown.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to Figs. 1, 2 and 3, the reference numeral 10 designates a motor vehicle body provided with a windshield 11 and a windshield pillar 12. The collapsible top construction of the present invention consists of a flexible covering 13 which is secured to the motor vehicle body 10 and is stretched over the framework of the top. The framework of the top consists of the header bar 14 which is connected to the outrigger lever 15 which is pivotally connected at its opposite end to the balancing lever 16. The balancing lever 16 is pivotally mounted on the jointed prop lever 17 which is pivotally connected to the pillar 18 which supports the main bow 19. The main bow 19 is an enlarged and strengthened bow which is larger and possesses increased strength over main bows previously suggested for collapsible tops of the present general type. As will be hereinafter more fully explained in detail, the main bow 19 is used as a torsion member as well as a main bow and is so strengthened as to assist in the transmission of torque forces through the bow and also to act as a top bumper member, the member possessing sufficient strength that in the event of an accident to the vehicle causing the vehicle to overturn, the main bow 19 if in the raised position will support without breaking the weight of the vehicle to which it is attached.

The main bow 19 and the pillar 18 are connected to a bell crank lever 20 which acts as a supporting arm and which is pivotally connected at 20a to the motor vehicle body 10. A curved lever 21 is pivotally connected at one end to the outrigger lever 15 at a point intermediate the end of the outrigger lever 15 and the header bar 14. The curved lever 21 is pivotally connected at its opposite end to the prop lever 17.

The rear bow 22 is pivotally connected to an arm of the bell crank 20 and an auxiliary bow 23 is pivotally connected to the arms of the rear bow 22. A balancing spring 24 is connected between an arm of the bell crank 20 and a bracket secured to the vehicle body 10. The spring 24 acts to balance the movement of the top members from the raised to the folded positions and acts to supply an additional force to assist in raising the top from the folded to the raised position.

The lower end 25 of the jointed prop lever 17 is pivotally connected to a bracket 26 which is secured to the motor vehicle body 10. The ends 25 of the prop lever 17 are secured to a transverse torsion member 27 which extends from the bracket 26 mounted on one side of the vehicle body to a similar bracket 26 mounted on the opposite side thereof. Thus forces transmitted to the prop lever 17 on one side of the vehicle body are transmitted through the torsion member 27 to the connected prop lever 17 on the opposite side of the vehicle body and cause a corresponding movement thereof.

The lever arm 28 is provided as a part of the top framework and is pivotally connected to the end of the balancing lever 16 at the pivotal connection 29 and is pivotally connected with the prop lever 17 at the pivot point 30. An extending arm 31 is provided on the lever member 28 and at one side of the vehicle is pivotally connected with a power actuated force-applying member 32 which, in the present instance, is a movable screw actuated by a worm 33 driven through a suitable gear train 34 by an electric motor which acts as the prime mover and which is driven by electric energy supplied from the battery 38 of the motor vehicle. The force-applying member 32, the worm 33, the gear train 34 and the motor 35 are all mounted on a suitable mounting bracket 36 which is pivotally connected at one end to the bracket 37 which is secured to the floor of the motor vehicle body 10.

The motor 35 is, as previously stated, supplied with energy from the electric storage battery 38 of the motor vehicle and is controlled from the passenger compartment by actuation of the reversing dash switch 39 which is electrically connected with limit switches 40 and 41 which are electrically connected with the motor 35. As most clearly shown in Figs. 4, 5 and 6, the limit switches 40 and 41 are synchronously actuated through the connecting link 44 which connects at one end with the toggle 42 on the switch 40 which is adapted to contact with a pin 43 provided on the screw 32. The opposite end of the connecting link 44 is connected with a toggle 45 on the limit switch 41 and is arranged for contact with a pin 50 on the screw 32.

An electrical lead 47 electrically connects the limit switch 40 with the motor 35 (Fig. 1) and an electrical lead 49 connects the limit switch 41 to the motor 35. An electrical lead 46 connects the dash switch 39 and the limit switch 40, and an electrical lead 48 connects the limit switch 41 and the dash switch 39.

The operation of the limit switches is as follows:

As shown in Fig. 4, when the top actuating screw 32 is in the retracted position, which is the position occupied by the screw when the top is in the folded position as shown in Fig. 3, the pin 43 contacts the toggle 42 and moves it in a downward position which breaks the circuit through the switch 40 and stops the motor. This motion is transmitted through the connecting link 44 to the toggle 45 on the limit switch 41 and an electrical connection is established between the limit switch 41 and the motor 35. Since this circuit can only be electrically actuated by movement of the dash switch 39 to establish contact through the line 48, it will be seen that the motor is stopped although it is ready for actuation in the opposite direction upon movement of the dash control switch 39 to the proper position.

Upon raising the top, the dash control switch 39 is suitably actuated to electrically connect the battery 38 with the lead 48 and this in turn causes the current to flow through the limit switch 41 and to the motor 35. This causes the screw 32 to be elevated and to raise the top to the position shown in Fig. 1. When this position is reached, the pin 50 on the screw 32 contacts the toggle 45 and breaks the circuit to the motor 35. Movement of the toggle 45 is transmitted through the connecting link 44 and a circuit is established through the limit switch 40 so that the motor is ready for actuation by current flowing through the line 46 when the dash control switch 39 is suitably actuated to establish electrical connection between the battery 38 and the line 46.

Any suitable gearing may be provided as the gear train 34 which is effective to cause the rotary direction of the motor to elongate and retract a power applying member which is connected to the top structure. In the present instance the extensible and retractable member is the screw 32 and, referring to Fig. 6, the suitable gearing may comprise a main drive gear 51 which is keyed to the shaft 52 of the motor 35. A gear 53 meshes with the main drive gear 51 and with the toothed rim 54 of the worm gear 33 which drives the screw member 32.

The operation of the top structure is as follows:

When the force-applying screw member 32 is moved to the raised position, the parts of the top framework occupy the relative positions shown in Fig. 1 and are maintained in this position by the releasable header lock 55 which locks the header bar 14 of the top to the transverse header provided on top of the windshield 11. To move the top from the raised position of Fig. 1 to the folded position shown in Fig. 3, the motor control switch 39 is suitably actuated to cause a flow of electric energy from the battery 38 through the line 46 and through the limit switch 40 to the motor 35. This causes the worm gear 33 to be driven in such a manner as to retract the screw 32. This motion is transmitted to the lever member 28 and from it to the balancing lever 16 and the prop lever 17.

The first movement after release of the header lock 55 is to raise the header bar 14 from the header provided on top of the windshield 11. This causes a movement of the outrigger link 15 which is transmitted through the curved lever 21 to the main bow 19. Since force is being applied to but the one side of the top structure, the lever member 21 on the side of the top adjacent the point of power application acts to transmit a force to the main bow 19. This force is transmitted through the main bow 19 to a member comparable to the lever member 21 placed on the opposite side of the top and the force is transmitted through the member 21 to an outrigger comparable to the outrigger 15 which is placed on such opposite side of the top. Thus it will be seen that the main bow 19 also functions as a torsion member and transmits torque from one side of the top structure to the opposite side thereof.

The downward movement of the screw 32 exerts a force on the jointed prop lever 17 causing it to pivot about its central joint and causes a swinging of the lower end 25 relative to the bracket 26. This swinging movement is transmitted through the transverse torsion bar 27 to the lower end of the prop lever which corresponds to the prop lever 17 and which is provided adjacent the side of the motor vehicle body opposite the side of power application.

As the application of force from the screw 32 to the member 28 continues, as the screw is retracted in the worm 33, the pillar 18 and the attached bell crank 20 are caused to pivot about the pivot point 20a. This causes the rear bow 22 and the auxiliary bow 23 to move to their respective folded positions and at the same time causes an extension of the spring 24. Thus it will be seen that the movement of the top from the raised to the lowered position is partially balanced by the extension of the spring 24 and the energy stored in the spring 24 is available for release into the system when the top is moved from its folded to its raised position.

When the top has reached the folded position as shown in Fig. 3, the limit switch 40 is actuated as previously described and the motor 35 is stopped. When it is desired to raise the top from the folded position of Fig. 3 to the raised position of Fig. 1, the dash control switch 39 is actuated so as to electrically connect the battery 38 with the lead 48 which causes electric energy to flow through the connected circuits to the motor 35 and to drive the motor 35 in a suitable direction to elevate the screw 32 from its retracted position shown in Fig. 3 to its fully extended position shown in Fig. 1. The movement of the top from the folded position to the raised position is accomplished through the exertion of forces from the screw 32 to the lever member 28. These forces are transmitted through the connected links and levers on the one side of the vehicle top to similar links and levers on the opposite side of the vehicle top through the torsion members 19 and 27. The actuation of the members is substantially the same as that described in the movement of the top from the raised position to the closed position except that the pivotal movement of the members are reversed.

From the foregoing it will be seen that a top structure embodying the present invention is so constructed that it may be raised and lowered by the application of a power actuated mechanism which is connected to but one side of the top and the forces necessary to raise and lower the top are transmitted through transversely extending torsion members to similar linkage and structural members provided on the opposite side of the top structure. While for purposes of simplification the top structure has been here described with relation to but one side of the vehicle body, it is to be understood that a comparable system of links and levers is provided on the opposite side thereof. It will also be seen that the actuating mechanism for raising and lowering the collapsible top is of a simplified design and construction, is positive in operation and may be readily controlled from a control switch placed in the passenger compartment of the vehicle.

I claim:

1. In a motor vehicle body having a foldable top and having a pivoted operating member therefor, mechanism for raising and lowering the top comprising a base mounted on the body, a gear casing freely and rockingly pivoted to said base, gears in said casing operatively connected to the operating member of the foldable top, and an electric motor drivingly connected to said gears, said electric motor being mounted on and rocking with said casing relatively to said base.

2. In a motor vehicle body having a foldable top and having an operating member therefor pivoted to the body, mechanism for raising and lowering the top comprising a base mounted on the body, a gear casing freely and rockingly pivoted to said base below the top operating member, a driven gear in said casing, a screw shaft connected to said driven gear, a nut threaded on such shaft and connected to the pivoted top operated member, a worm meshing with the driven gear in said casing, and an electric motor mounted on said casing and having a drive shaft coupled to said worm, said motor rocking with said casing relative to said base.

3. In a motor vehicle body having a foldable top and having an operating member therefor, a mechanism for raising and lowering the top and removable from the body as a unit and comprising a base mounted on the body, a gear casing pivoted to said base to provide for swinging movement with the pivoted operating member, reduction gearing including a drive gear and a driven gear in said casing, a rotatable screw having one end connected to said driven gear, an internally threaded nut on said screw and detachably connected to said operating member, and an electric motor operably connected to said drive gear and mounted on and rocking with said casing relative to said base.

AUGUST KELLER.